United States Patent
Fukagawa et al.

(10) Patent No.: US 9,414,257 B2
(45) Date of Patent: Aug. 9, 2016

(54) RADIO COMMUNICATION DEVICE AND FILE TRANSFER METHOD

(71) Applicant: FUJITSU LIMITED, Kawasaki-shi, Kanagawa (JP)

(72) Inventors: Kouya Fukagawa, Yokohama (JP); Masahiro Oosugi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 87 days.

(21) Appl. No.: 14/313,726

(22) Filed: Jun. 24, 2014

(65) Prior Publication Data

US 2015/0078165 A1 Mar. 19, 2015

(30) Foreign Application Priority Data

Sep. 18, 2013 (JP) .................................. 2013-192737

(51) Int. Cl.
*H04J 3/06* (2006.01)
*H04W 28/02* (2009.01)
*H04L 12/823* (2013.01)

(52) U.S. Cl.
CPC ........... *H04W 28/0221* (2013.01); *H04L 47/32* (2013.01)

(58) Field of Classification Search
CPC .............................. H04W 8/0221; H04L 47/32
USPC .................................................. 370/508–519
See application file for complete search history.

(56) References Cited

U.S. PATENT DOCUMENTS

| | | | | |
|---|---|---|---|---|
| 8,203,483 | B2* | 6/2012 | Richards | H01Q 3/2682 342/368 |
| 8,886,205 | B2* | 11/2014 | Gaal | H04W 56/0045 455/450 |
| 8,934,452 | B2* | 1/2015 | Zou | H04W 56/0045 370/331 |
| 2012/0096122 | A1 | 4/2012 | Zhu et al. | |
| 2012/0216238 | A1 | 8/2012 | Cristallo et al. | |
| 2014/0029586 | A1* | 1/2014 | Loehr | H04W 56/0005 370/336 |

FOREIGN PATENT DOCUMENTS

| | | | |
|---|---|---|---|
| JP | 2012-085201 A1 | 4/2012 | |
| JP | 2012-085299 A1 | 4/2012 | |
| JP | 2013-508871 A1 | 3/2013 | |

* cited by examiner

*Primary Examiner* — Phuc Tran
(74) *Attorney, Agent, or Firm* — Arent Fox LLP (57) ABSTRACT

A radio communication device includes: a controller, provided in a cell belonging to a first base station at a position, configured to obtain a start time of transfer of a file from a file server based on a first delay time that is based on a physical cell identity of the cell and a second delay time that is based on reception power measured at the position in the cell.

20 Claims, 10 Drawing Sheets

| MACRO INFORMATION | PCI | FIRST DELAY TIME (h) (TIME 1) |
|---|---|---|
| [0] | 10 | 0 |
| [1] | 20 | 1 |
| [2] | 30 | 2 |
| [3] | 50 | 3 |
| ⋮ | ⋮ | ⋮ |
| ⋮ | ⋮ | ⋮ |
| [23] | 500 | 23 |

FIG. 4

| RSRP | RSRP VALUE | SECOND DELAY TIME (m) (TIME 2) |
|---|---|---|
| [0] | 0 ~ -70 | 0 |
| [1] | -71 ~ -80 | 3 |
| [2] | -81 ~ -90 | 6 |
| ⋮ | ⋮ | ⋮ |
| ⋮ | ⋮ | ⋮ |
| [8] | -140 ~ -150 | 24 |

FIG. 5

| PCI | RSRP VALUE |
|-----|------------|
| 10  | -75        |
| 140 | -90        |
| 350 | -100       |

ATTRIBUTE INFORMATION MANAGEMENT TABLE 500

| HeNB | ADJACENT MACRO (PCI) | RSRP (dBm) |
|---|---|---|
| #1 | 10 | -90 |
| #2 | 10 | -85 |
| #3 | 10 | -65 |
| #4 | 30 | -70 |
|    | 80 | -110 |
| #5 | 40 | -60 |
| #6 | 60 | -80 |
| #7 | 80 | -84 |
|    | 90 | -90 |
| #8 | 90 | -55 |
| : | : | : |
| : | : | : |
| #254 | 200 | -85 |
| #255 | 210 | -95 |
| #256 | 220 | -105 |

FILE TRANSFER INFORMATION MANAGEMENT TABLE 1 300

| MACRO INFORMATION (PCI) | TIME 1 (h) |
|---|---|
| 10 | 0 |
| 20 | 1 |
| 30 | 2 |
| 40 | 3 |
| 50 | 4 |
| 60 | 5 |
| 70 | 6 |
| 80 | 7 |
| 90 | 8 |
| : | : |
| : | : |
| 200 | 15 |
| 210 | 16 |
| 220 | 17 |

FILE TRANSFER INFORMATION MANAGEMENT TABLE 2 400

| RSRP (dBm) | TIME 2 (min) |
|---|---|
| 0~-70 | 0 |
| -71~-80 | 3 |
| -81~-90 | 6 |
| -91~-100 | 9 |
| -101~-110 | 12 |
| -111~-120 | 15 |
| -121~-130 | 18 |
| -131~-140 | 21 |
| -141~-150 | 24 |

⇓ SET FILE TRANSFER START TIME

FILE TRANSFER START TIME

| | HeNB | TIME 1+TIME 2 | TRANSFER START TIME | TRANSFER ORDER |
|---|---|---|---|---|
| IDENTICAL GROUP ⎰ | #1 | 0+6 | 6 MINUTE | 2 |
|                    | #2 | 0+6 | 6 MINUTE | 2 |
| | #3 | 0+0 | 0 MINUTE | 1 |
| | #4 | 120+0 | 120 MINUTE | 3 |
| | #5 | 180+0 | 180 MINUTE | 4 |
| | #6 | 300+3 | 303 MINUTE | 5 |
| | #7 | 420+6 | 426 MINUTE | 6 |
| | #8 | 480+0 | 480 MINUTE | 7 |
| | : | : | : | : |
| | : | : | : | : |
| | #254 | 200 | 906 MINUTE | 8 |
| | #255 | 210 | 966 MINUTE | 9 |
| | #256 | 220 | 1026 MINUTE | 10 |

RADIO COMMUNICATION DEVICE AND FILE TRANSFER METHOD

CROSS-REFERENCE TO RELATED APPLICATION

This application is based upon and claims the benefit of priority of the prior Japanese Patent Application No. 2013-192737, filed on Sep. 18, 2013, the entire contents of which are incorporated herein by reference.

FIELD

Embodiments discussed herein are related to a radio communication device and a file transfer method.

BACKGROUND

A micro base station, for example, a Home eNodeB (HeNB) stores software (load module), system data (CM file), and the like.

The related arts are discussed in Japanese National Publication of International Patent Application No. 2013-508871, Japanese Laid-open Patent Publications Nos. 2012-85201 and 2012-85299.

SUMMARY

According to one aspect of the embodiments, a radio communication device includes: a controller, provided in a cell belonging to a first base station at a position, configured to obtain a start time of transfer of a file from a file server based on a first delay time that is based on a physical cell identity of the cell and a second delay time that is based on reception power measured at the position in the cell.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Files such as software (load module) and system data (CM file) are updated in accordance with addition of a function to and treatment of a bug of a software. The updated file is downloaded to HeNB from a file server such as a home energy management system (HeMS) through a network.

At the time of file update of the HeNB, in a network between the HeNB and the HeMS, an http session is established, and a transfer scheme using "http" is employed. The file transfer employs a scheme (1) in which the HeMS controls file transfer for a plurality of HeNB collectively at the initiative of the HeMS and a scheme (2) in which each of the HeNB controls file transfer from the HeMS at the autonomous initiative of the plurality of HeNB.

For example, in the file update of the HeNB, when a number of home devices complete downloading of the files at the same time, each of the home devices dispersedly informs an automatic configuration server that does not participate in the file transfer of a file transfer result without applying a load to the automatic configuration server. For example, information on an eNB and a HeNB that have different uses are obtained by the server, and mutual association and installation of the eNB and the HeNB, and management such as setting of a radio parameter are performed in conjunction. When user equipment at the end point such as a mobile terminal downloads a file, a proxy server of a radio service provider downloads the file to the user equipment through a femto base station that is associated with the user equipment.

In the above-described scheme (1) of the file transfer at the initiative of the HeMS, file updates to the plurality of HeNB may be performed at different times from each other through time scheduling. For example, in the above-described scheme (2) of the file update at the initiative of the plurality of HeNB, the plurality of HeNB for which the file update is desired accesses the file server all at once, for example, in a certain time period range using power application or resetting as a trigger. Therefore, a transfer time is increased in which files are transferred from the file server (HeMS) to the plurality of HeNB, so that a load is applied to the network. Regardless of operation performance of the HeNB, the file update is performed on the plurality of HeNB in the same way, so that the file update is performed even on a HeNB for which the update is not desired, and an excessive load may be applied to the network.

Figure 1:
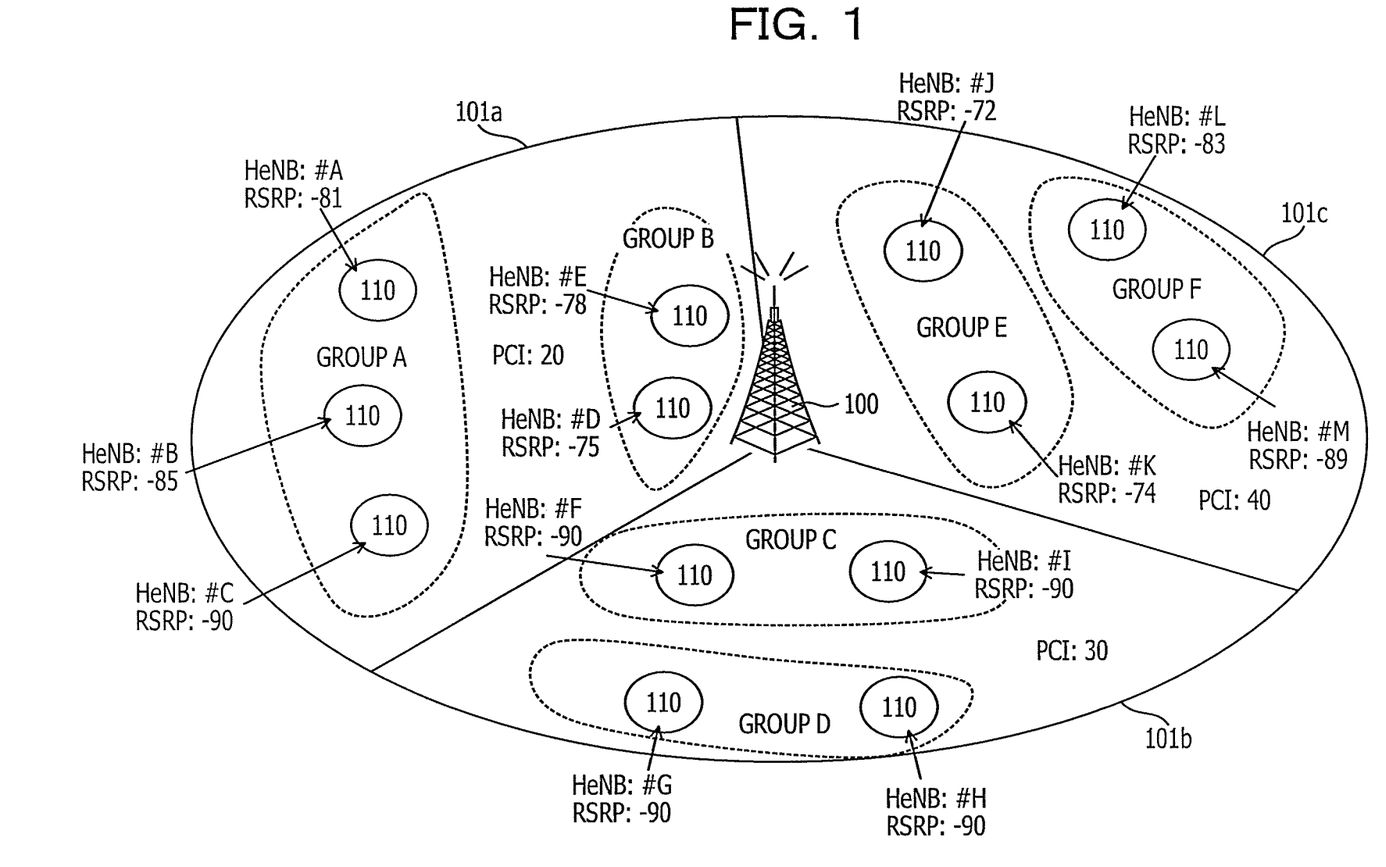
FIG. 1 illustrates an example of a grouping of HeNB based on reference signal reception power and arrangement of HeNB.

FIG. 1 illustrates an example of a grouping of HeNB based on reference signal reception power and arrangement of the HeNB. For example, the above-described scheme (2) may be employed in which each of the plurality of micro base stations (HeNB) that are radio communication devices control the file transfer from the file server (for example, HeMS) at the autonomous initiative of the plurality of micro base stations (HeNB). In the file transfer, for example, update files such as software (load module), system data (CM file), and the like of a HeNB are downloaded from the file server.

A macro base station 100 (macro eNB, and hereinafter referred to as an eNB) that is a first base station includes a plurality of cells (macro cells). In FIG. 1, the eNB includes three macro cells 101 (101a to 101c). For the cells, physical cell identities (PCI) 20, 30, and 40 are respectively set. A plurality of HeNB 110 is arranged in each of the macro cells 101 (101a to 101c).

The HeNB 110 includes attribute information that indicates one of the macro cells 101 (101a to 101c) to which the HeNB 110 belongs, as network information. Here, a plurality of eNB 100 is arranged under the control of the HeMS that manages the HeNB 110. The PCI is different depending on each of the cells in each of the plurality of eNB 100.

For example, each of the HeNB 110 decides transfer order at the time of file transfer from the HeMS, based on PCI of cells that are included in the eNB 100. The file transfer is performed so that the transfer times of the plurality of HeNB 110 become different from each other. A number of HeNB 110 may exist in an identical eNB 100. Therefore, the HeNB 110 uses reference signal received power (RSRP) of the eNB 100, which is received by user equipment (UE) that is coupled to the HeNB 110, as information that is used to cause the transfer times to be different from each other at the time of the file transfer.

For example, in FIG. 1, in the macro cell 101a (PCI: 20) of the eNB 100, five HeNB 110 (#A to #E) are arranged in total. File transfer order is set by the five HeNB 110 (#A to #E) so that a first delay time for each cell (unit of an hour up to 24 hours) and a second delay time for each RSRP (unit of minutes) are combined. The second delay time is set in one or more unit of minutes. The unit of minutes is obtained by dividing a time range of one hour that corresponds to the first delay time.

For example, in the macro cell 101a (PCI: 20), "one hour" is set as the first delay time. In the macro cell 101b (PCI: 30), "two hours" is set as the first delay time. The plurality of HeNB 110 (#A to #E) is grouped into a plurality of stages based on the RSRP in the macro cell 101a. In FIG. 1, the plurality of HeNB 110 (#A to #E) is grouped into a group A of the HeNB 110 (#A to #C) having small RSRP ("–80" or less) and a group B of the HeNB 110 (#D and #E) having large RSRP (more than "–80") using "–80" as a threshold value.

For example, in FIG. 1, when the HeNB 110 belongs to the group A, the second delay time may be 0 minute, and when the HeNB 110 belongs to the group B, the second delay time may be three minutes. For example, the HeNB 110 does not have information on a group to which the HeNB belongs, so that the HeNB 110 does not perform such determination. When there exists a further HeNB 110 having an identical transfer timing of an update file to the HeNB 110, the file update may be performed on these HeNB 110 in a unit of the identical group.

In each of the HeNB 110, a file transfer start time that is a total value of a first delay time and a second delay time is set as transfer order at the time of file transfer. In the HeNB 110 (#A to #C) that belong to the group A of the macro cell 101a, "first delay time+second delay time=one hour and 0 minute" is set, and in the HeNB 110 (#D and #E) that belong to the group B of the macro cell 101a, "first delay time+second delay time=one hour and three minutes" is set.

A file transfer start time of the HeNB 110 is set so as to be different from a further HeNB 110, based on a total value of a first delay time that is different depending on each of the macro cells 101a to 101c (PCI: 20 to 40) of the eNB 100 and a second delay time based on the size of RSRP in each of the macro cells 101. Here, an identical file transfer start time may be set to the plurality of HeNB 110 in an identical group. When a delay time is 0, the HeNB 110 starts file transfer (download of an update file) from the HeMS without delay for a certain timing. When a delay time is not 0, the HeNB 110 starts file transfer (download of update file) from the HeMS so as to delay the file transfer by the delay time portion.

Figure 2:
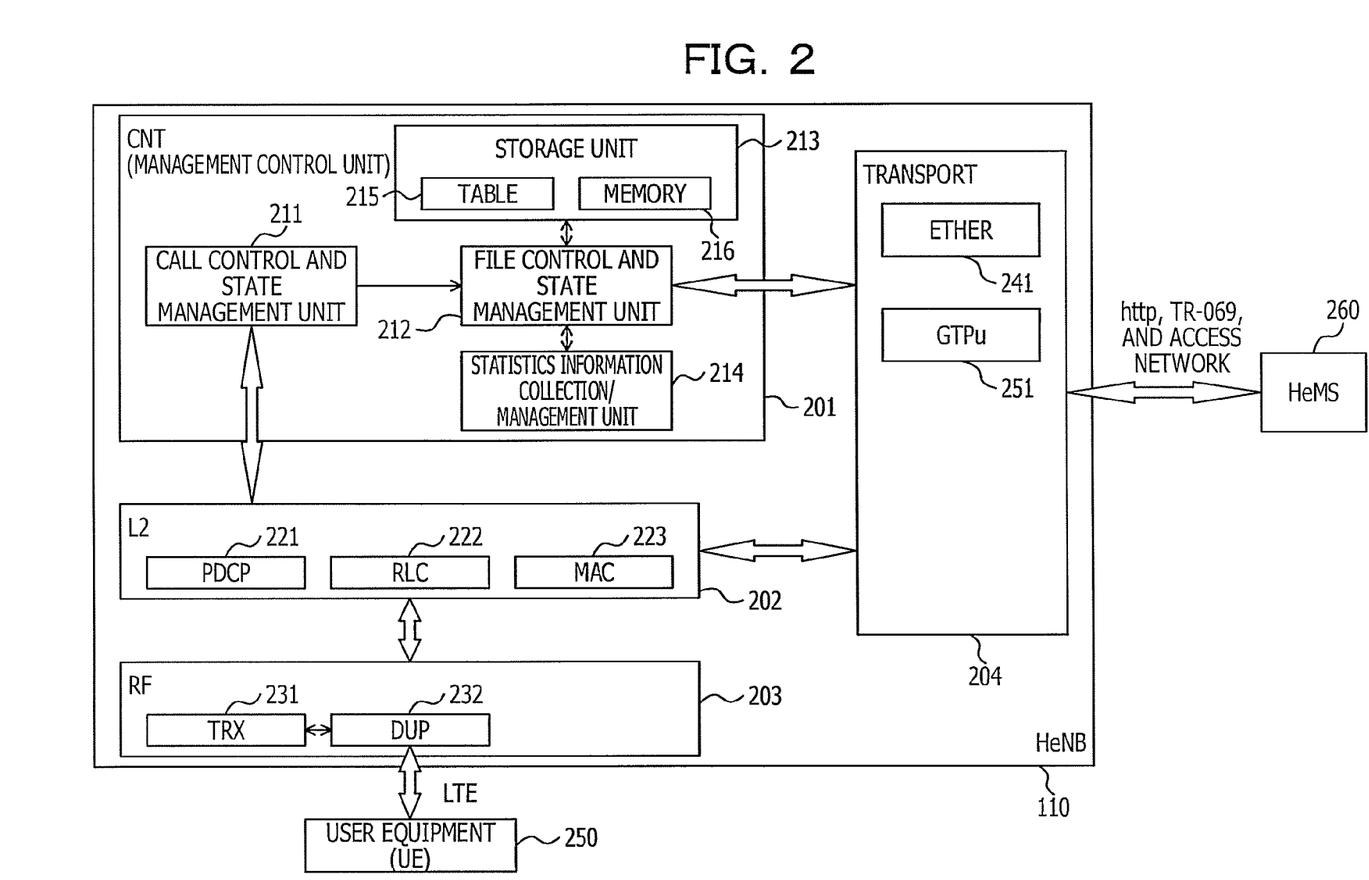
FIG. 2 illustrates an example of a structure of HeNB.

FIG. 2 illustrates an example of a structure of HeNB. The HeNB 110 includes a management control unit 201, a layer 2 (L2) control unit 202, a radio frequency (RF) control unit 203, and a transformer port control unit 204.

The management control unit 201 includes a call control and state management unit 211, a file control and state management unit 212, a storage unit 213, and a statistics information collection and management unit 214. The call control and state management unit 211 accepts call control and performs sequence control that is related to the call control, and creates attribute information on file update of the HeNB 110.

The management control unit 201 executes a management control function by a processor such as a central processing unit (CPU) or a digital signal processor (DSP), and a memory such as a read-only memory (ROM) or a random access memory (RAM), and hardware such as a timer.

The file control and state management unit 212 accepts file update, calculates a transfer time (first delay time+second delay time) of file transfer control in the HeNB at the time of acceptance of the file transfer, and controls download of an update file.

The storage unit 213 includes a table 215 and a memory 216. The table 215 includes a plurality of tables that are used to calculate a first delay time and a second delay time. The memory 216 includes a plurality of areas that are used for data processing by which a transfer time (first delay time+second delay time) and the like are calculated, for example, memories 1 to 4.

By providing the statistics information collection and management unit 214 in the management control unit 201, processing of counting a number of connections is executed, and the file transfer control of the HeNB is performed based on the statistics processing result. For example, the statistics information collection and management unit 214 performs the following control (1) and (2).

(1) A HeNB 110 that receives a communication request (call) from the user equipment infrequently has a low urgency level, so that the file transfer is performed at the timing of receiving a call in the HeNB 110 regardless of information on the eNB 100. As the HeNB 110 that has a low urgency level, a HeNB 110 may be set in which it takes a number of days that is specified on the system or more since the previous call (last call) has been received. The number of days may be changed on the system data.

(2) Statistical information of call processing is obtained for each HeNB 110, and in a HeNB in which a call processing load is applied frequently in the daytime, the time of the file transfer may be set to the nighttime. In the statistical information, an access time at the time of call connection (user data transfer time at the time of call connection) is collected, and the transfer time is switched dynamically.

The L2 control unit 202 includes control units of a packet data convergence protocol (PDCP) 221, a radio link control (RLC) 222, and a medium access control (MAC) 223 of each sub-layer in a layer 2.

The RF control unit 203 includes a transmission and reception unit (TRX) 231 and a duplexer (DUP) 232. The HeNB 110 transmits and receives data to and from UE 250 through a path that passes through the RF control unit 203, to the L2 control unit 202, and to the management control unit 201 (call control and state management unit 211) by radio communication.

The transformer port control unit 204 is coupled to and communicates with the system (access network, HeMS 260, and the like) through the Ethernet 241 (registered trademark) and a GPRS tunneling protocol for user plane (GTPu) 251. For the communication control, an http protocol, a Technical Report 069 (TR-069) protocol, and the like may be used. The HeNB 110 downloads an update file from the file server such as the HeMS through the transformer port control unit 204 by the control of the file control and state management unit 212.

Figure 3:
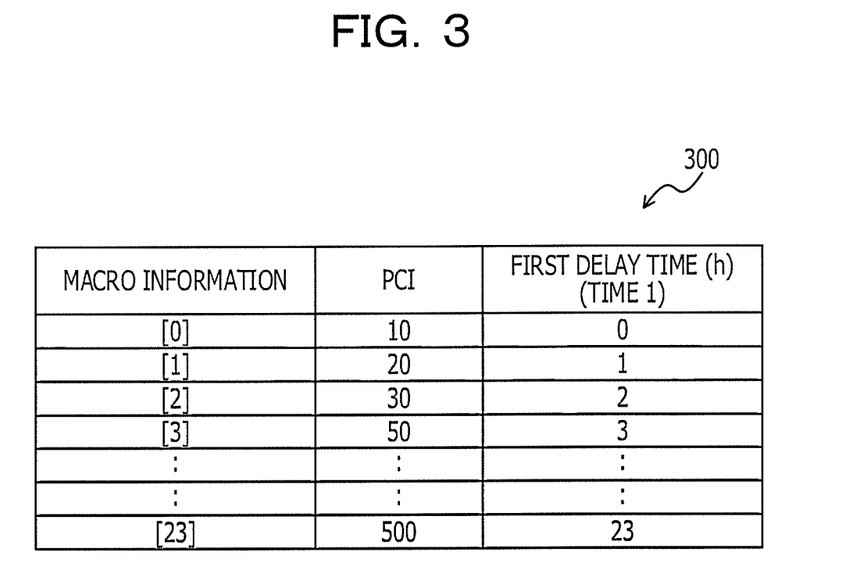
FIG. 3 illustrates an example of a table of HeNB.
Figure 4:
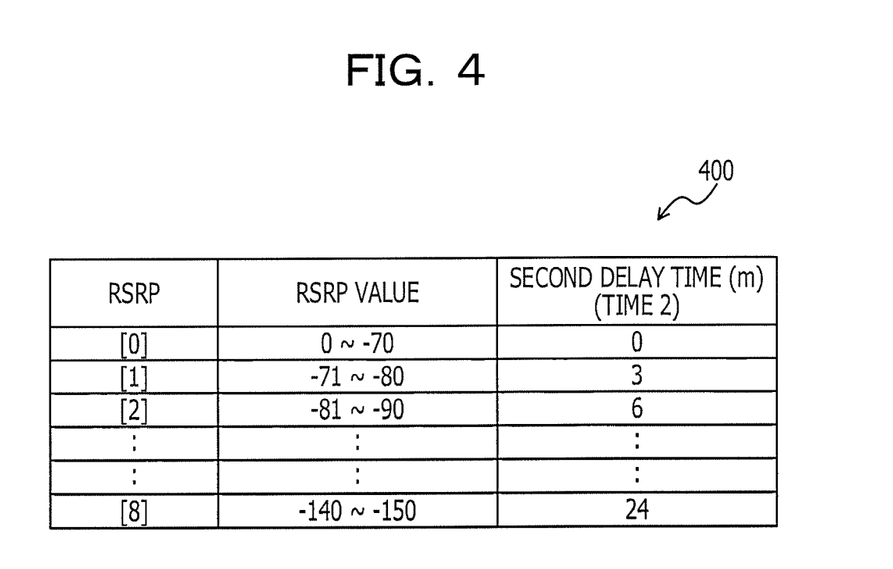
FIG. 4 illustrates an example of a table of HeNB.
Figure 5:
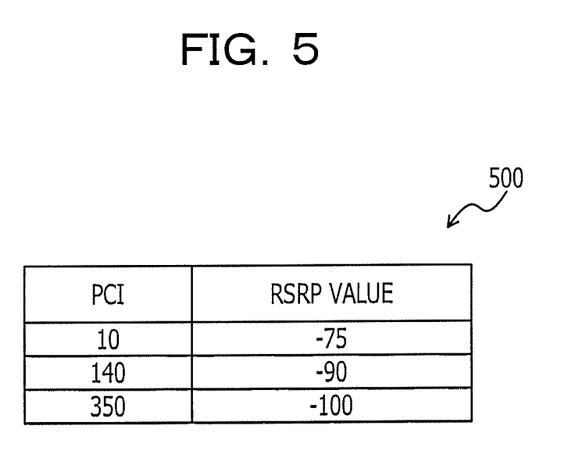
FIG. 5 illustrates an example of a table of HeNB.

FIGS. 3 to 5 illustrate an example of a table of HeNB. The tables illustrated in FIGS. 3 to 5 may be provided as the table 215 of the storage unit 213 illustrated in FIG. 2.

FIG. 3 illustrates an example of a file transfer information management table 1. In the file transfer information management table 1 (300), a first delay time (Time 1) that is different depending on each of the macro cells (PCI) 101 of the eNB 100 is set. As illustrated in FIG. 3, first delay times, which are obtained by setting in the unit of an hour (24 hours portion for one day) for each different PCI in a single eNB 10, are set. For example, a physical cell identity of a macro cell (PCI) may be 0 to 500, and a default corresponds to 256.

In FIG. 3, in accordance with the ascending order of the numerical value of a PCI, a first delay time is set at 0 hour when the PCI is 10, and a first delay time is set at an hour when the PCI is 20, and a different first delay time is set in the unit of an hour for each PCI. When a number of macro cells (PCI) is large, a substantially identical delay time may be set to macro cells that are different, for example, not adjacent to each other. For example, a default time when there is no corresponding PCI may be set at "(maximum hour+1) hour". In FIG. 3, "24 hours" may be set when there is no corresponding PCI because the maximum time is "23 hours" in FIG. 3.

FIG. 4 illustrates an example of a exemplary file transfer information management table 2. In the file transfer information management table 2 (400), a second delay time (Time 2) is set that is different depending on each of a plurality of stages into which RSRP is divided.

In FIG. 4, a default of the width (value) of RSRP in each of the stages is set at 10 dBm, and an interval of second delay times may be set at three minutes. The second delay time may be set so as to correspond to a time that is taken for file update, for example, three minutes, and the width (value) of RSRP in each of the stages and an interval of second delay times may be set arbitrarily. For example, by causing the second delay time to correspond to the file update (download time), the file update is performed on different groups in different times on a network during a time period until the update is completed, and a number of HeNB 110 on which file update is performed at the same time may be reduced.

In FIG. 4, in the stage in which the value of the RSRP is largest (0 to −70), the second delay time is set at 0 minute, and in the next stage (−71 to −80), the second delay time is set at three minutes, and the second delay time may be set so as to be different depending on each of the RSRP in a unit of three minutes.

The information that is stored in the file transfer information management tables 1 and 2 (300 and 400) illustrated in FIGS. 3 and 4 may be set and updated in accordance with the transfer control from the HeMS 260 that is coupled to the network.

FIG. 5 illustrates an example of an attribute information management table. In an attribute information management table 500, RSRP information for each PCI is managed. The RSRP value may be reception power of the macro cell 101, which is collected by the UE 250 at the time of call connection.

The UE 250 obtains information (PCI and RSRP) on a macro cell to which the HeNB 110 belongs, by automatic network routing (ANR) at the time of call connection. The UE 250 that is coupled to the HeNB 110 measures reception power of the eNB 100.

For example, in such a state, the UE 250 is located in (near) a communication range of the HeNB 110, and measures reception power that is different depending on a distance from the eNB 100 to the UE 250 or the like. As information that is used to individualize the plurality of HeNB 110, the reception power may be used. The HeNB 110 stores the information (PCI and RSRP) on the macro cell, which is obtained by the UE 250, in the attribute information management table 500. In FIG. 5, an RSRP value of the PCI 10 may be −75 dBm.

Figure 6:
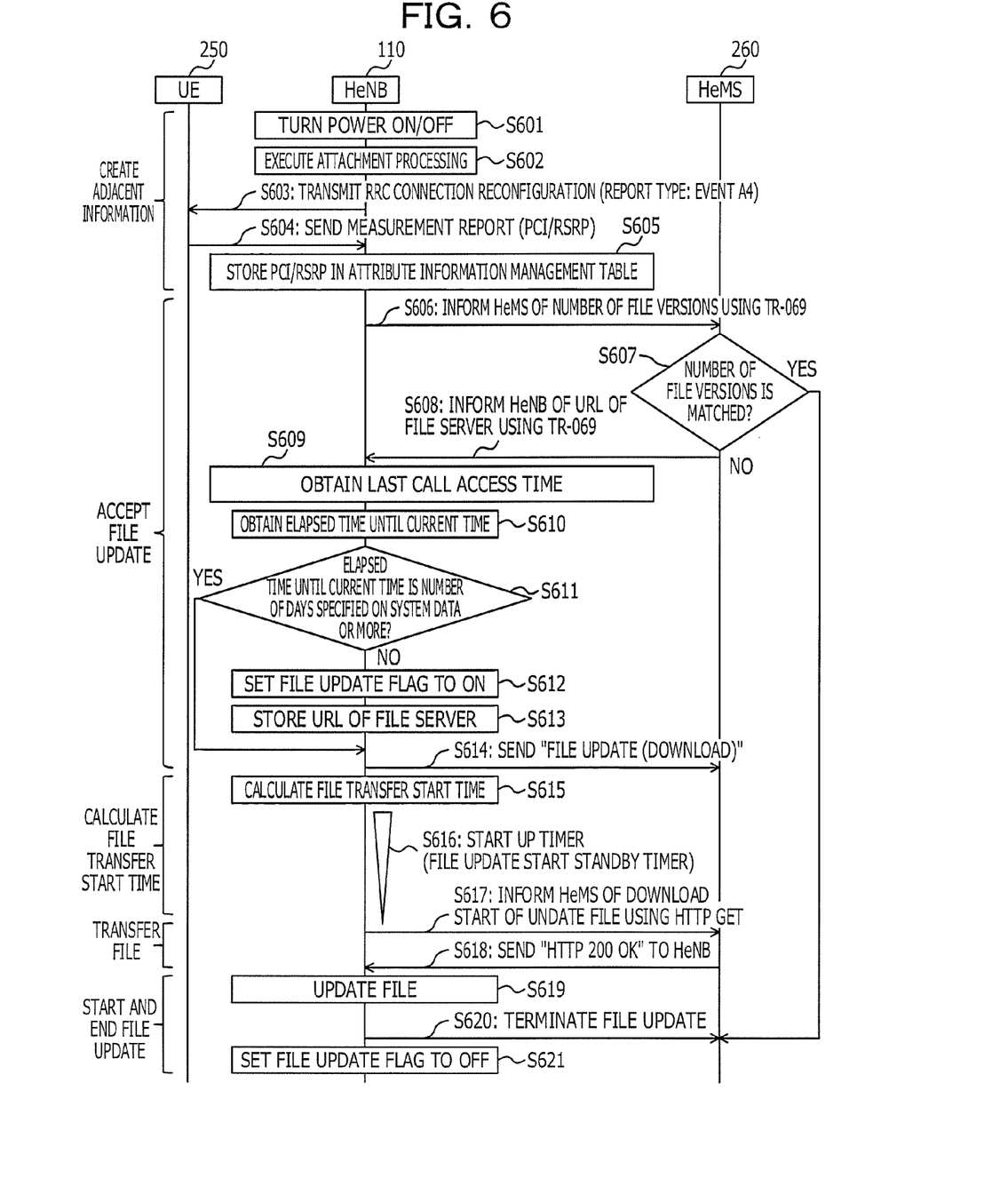
FIG. 6 illustrates an example of a processing of an update file.

FIG. 6 illustrates an example of a processing of an update file. At a certain timing, for example, at the time of start-up (or reset) of power of the HeNB 110 (Operation S601), the HeNB 110 executes attachment processing (Operation S602). The HeNB 110 executes a connection establishment procedure for the UE 250, and performs transmission of an RRC message (RRC connection reconfiguration (report type: Event A4)) (Operation S603). The UE 250 transmits a measurement report (PCI/RSRP) for the HeNB 110 in response to the RRC message (Operation S604).

The HeNB 110 stores the PCI and RSRP that are transmitted from the UE 250, in the attribute information management table 500 (Operation S605). The HeNB 110 informs the HeMS 260 of a number of file versions of the HeNB 110 using a TR-069 protocol (Operation S606).

The HeMS 260 determines whether or not a number of file versions that is informed from the HeNB 110 is matched with the latest number of file versions (Operation S607). When the HeMS 260 determines that a number of file versions that is informed from the HeNB 110 is not matched with the latest number of file versions ("No" in Operation S607), the HeMS 260 informs the HeNB of an address (URL) of the file server in which the latest file of the HeNB 110 is stored, for example, the address of the HeMS 260 (Operation S608). When the HeMS 260 determines that the number of file versions that is informed from the HeNB 110 is matched with the latest number of file versions ("Yes" in Operation S607), the processing of file update ends.

When the address of the file server based on the determination result of the HeMS 260 is informed to the HeNB 110 (Operation S608), the HeNB 110 obtains a last call access time by the call control and state management unit 211 (Operation S609), and obtains an elapsed time until the current time (Operation S610). The HeNB 110 determines whether or not the elapsed time until the current time is the number of days that is specified on the system data or more (Operation S611). When the elapsed time until the current time corresponds to the number of days that is specified on the system data or more ("Yes" in Operation S611), the HeNB 110 transmits "file update (download)" for the HeMS 260 as a response using the TR-069 protocol (Operation S614), and the processing ends. Processing in Operation S615 and subsequent operations may not be executed.

When the elapsed time until the current time is less than the number of days that is specified on the system data ("No" in Operation S611), the HeNB 110 determines that there is an update file, sets a file update flag to ON (Operation S612), and stores the address (URL) of the file server (Operation S613). The HeNB 110 transmits the file update (download) for the HeMS 260 as a response using the TR-069 protocol (Operation S614).

The HeNB 110 calculates a file transfer start time (Operation S615). The HeNB 110 operates a file update start standby timer for the calculated file transfer start time period (Operation S616).

The HeNB 110 informs the HeMS 260 of download start of an update file using an http message (HTTP GET) after the timer has expired (Operation S617). The HeMS 260 informs the HeNB 110 of a reply (HTTP 200 OK) that indicates download start of the update file (Operation S618).

The HeNB 110 downloads the update file from the HeMS 260 and performs the file update (Operation S619). When the file update is completed, the HeNB 110 informs the HeMS 260 of completion of the file update (Operation S620), and set the file update flag to OFF (Operation S621), and the file update processing ends.

Figure 7:
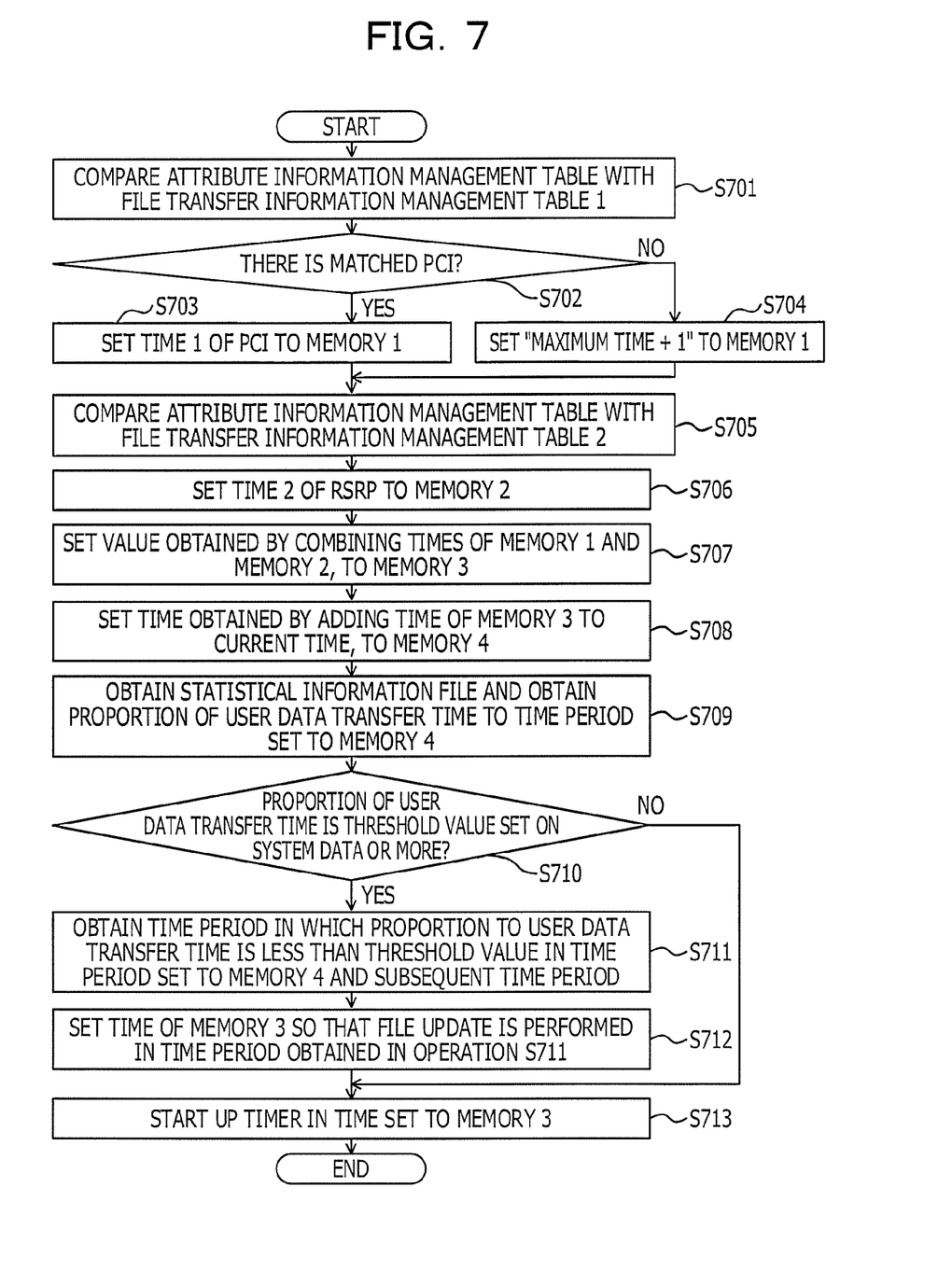
FIG. 7 illustrates an example of a processing of calculating a file transfer start time.

FIG. 7 illustrates an example of a processing of calculating a file transfer start time. In FIG. 7, processing of calculating a download start time of an update file, which is performed by the HeNB 110, is illustrated. In FIG. 7, statistics processing by the statistics information collection and management unit 214 is illustrated.

The HeNB 110 (statistics information collection and management unit 214) compares the attribute information management table 500 with the file transfer information management table 1 (300) (Operation S701). The HeNB 110 (file control and state management unit 212) determines whether or not there is a matched PCI, based on the comparison result (Operation S702). When there is a matched PCI ("Yes" in Operation S702), a first delay time (Time 1) of the PCI in the file transfer information management table 1 (300) is set to an area of the memory 1 in the memory 216 (Operation S703). When there is no matched PCI ("No" in Operation S702), "maximum time+1" is set to the area of the memory 1 in the memory 216 (Operation S704).

After execution of Operation S703 or S704, the HeNB 110 (file control and state management unit 212) compares the attribute information management table 500 with the file transfer information management table 2 (400) (Operation S705). The HeNB 110 (file control and state management unit 212) sets a second delay time (Time 2) of RSRP that corresponds to the PCI to an area of the memory 2 in the memory 216, based on the comparison result (Operation S706).

The HeNB 110 (file control and state management unit 212) sets a value that is obtained by combining the times in the memory 1 and the memory 2 (first delay time+second delay time), to the memory 3 (Operation S707). A time until file update is started is set in the memory 3.

The HeNB 110 (statistics information collection and management unit 214) sets a time that is obtained by adding the time in the memory 3 to the current time, to an area of the memory 4 in the memory 216 (Operation S708). The HeNB 110 (statistics information collection and management unit 214) obtains a statistical information file, and obtains a proportion of a user data transfer time to the time period that is set to the memory 4 (Operation S709).

The HeNB 110 (statistics information collection and management unit 214) determines whether or not the proportion of the user data transfer time is a threshold value that is set on the system data or more, for example, 80% or more (Operation S710). For example, the HeNB 110 (statistics information collection and management unit 214) determines that the proportion of the user data transfer time is the threshold value that is set on the system data or more ("Yes" in Operation S710), the HeNB 110 (statistics information collection and management unit 214) determines that call processing is executed frequently, and the processing proceeds to Operation S711, and when the HeNB 110 (statistics information collection and management unit 214) determines that the proportion of the user data transfer time is less than the threshold value that is set on the system data ("No" in Operation S710), the processing proceeds to Operation S713.

In Operation S711, the HeNB 110 (statistics information collection and management unit 214) obtains a time period in which a proportion to the user data transfer time is less than the threshold value in the time period that is set to the memory 4 and a subsequent time period (Operation S711). For example, a time that is obtained by further adding a certain time to the time that is obtained by combining the first delay time (Time 1) and the second delay time (Time 2) may be set as the transfer start time because the call processing is executed frequently. The HeNB 110 (statistics information collection and management unit 214) sets the time of the memory 3 in the memory 216 so that the file update is performed in the above-described time period (time period that is obtained in Operation S711) (Operation S712).

The HeNB 110 (file control and state management unit 212) starts up the timer in the time that is set to the memory 3 (Operation S713), and the processing of calculating a file transfer start time ends.

Figure 8:
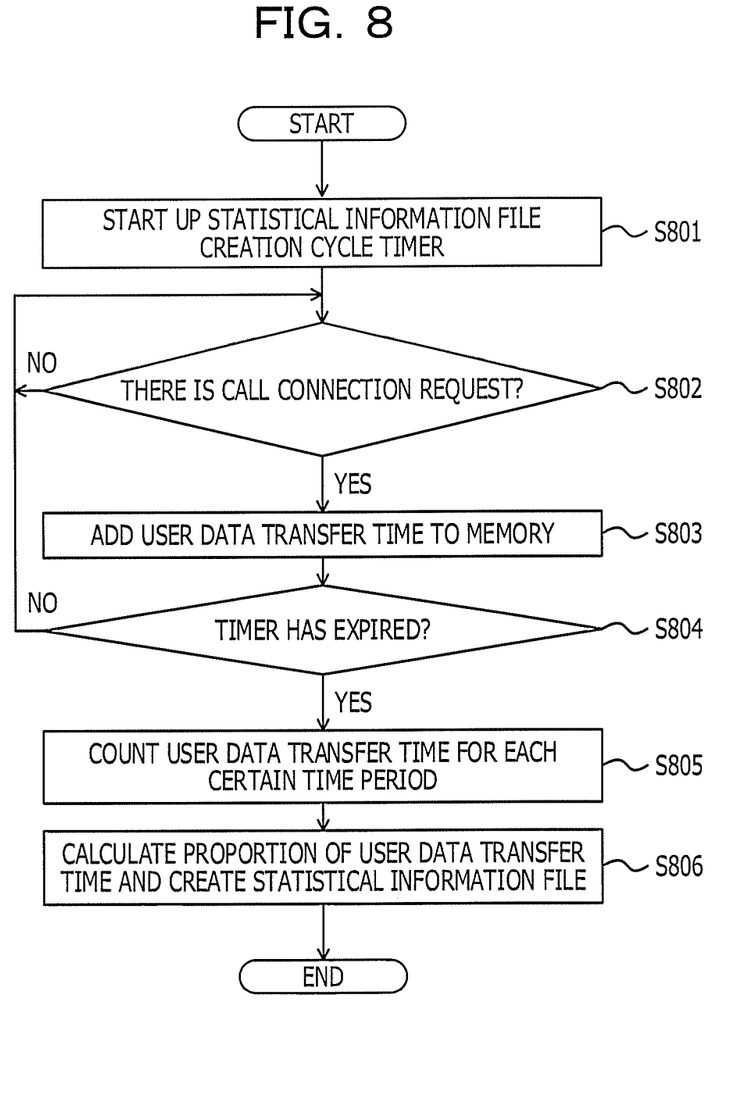
FIG. 8 illustrates an example of a processing of statistical information.

FIG. 8 illustrates an example of a processing of statistical information. In FIG. 8, the processing of statistical information, which is executed by the statistics information collection and management unit 214 of the HeNB 110 illustrated in FIG. 2 is illustrated. In FIG. 8, creation processing of the statistical information file that is used in Operation S712 of FIG. 7 is illustrated.

The statistics information collection and management unit 214 of the HeNB 110 starts up a statistical information file creation cycle timer (for example, unit of an hour) (Operation S801). The statistics information collection and management unit 214 determines whether or not there is a call connection request, by using the call control and state management unit 211 (Operation S802). When there is a call connection request ("Yes" in Operation S802), the processing proceeds to Operation S803, and when there is no call connection request, the processing waits until there is a call connection request ("No" is repeated in Operation S802).

In Operation S803, the statistics information collection and management unit 214 of the HeNB 110 adds a user data transfer time at the time of call connection, to the memory 216 (nonvolatile memory) (Operation S803), and determines whether or not the timer has expired (one hour expiry) (Operation S804). When the timer has not expired ("No" in Operation S804), in the statistics information collection and management unit 214, the processing returns to Operation S802, and when the timer has expired ("Yes" in Operation S804), the processing proceeds to Operation S805.

In Operation S805, the statistics information collection and management unit 214 counts a user data transfer time from the memory 216 (nonvolatile memory) for each certain time period, for example, each hour (Operation S805). The statistics information collection and management unit 214 calculates a proportion of the user data transfer time, and creates a statistical information file (Operation S806), and the processing ends.

Figure 9:
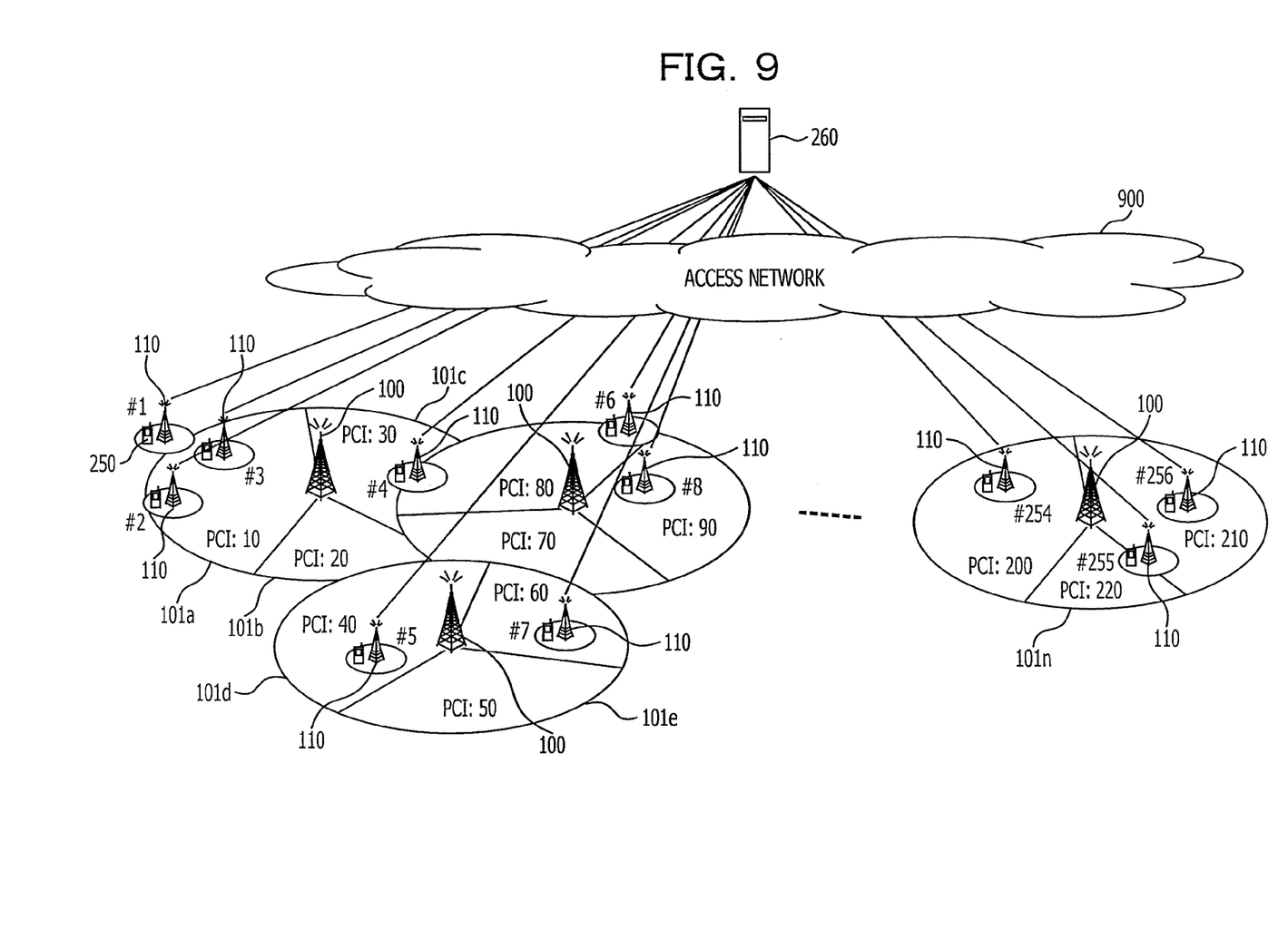
FIG. 9 illustrates an example of a setting of a file transfer start time.
Figure 10:
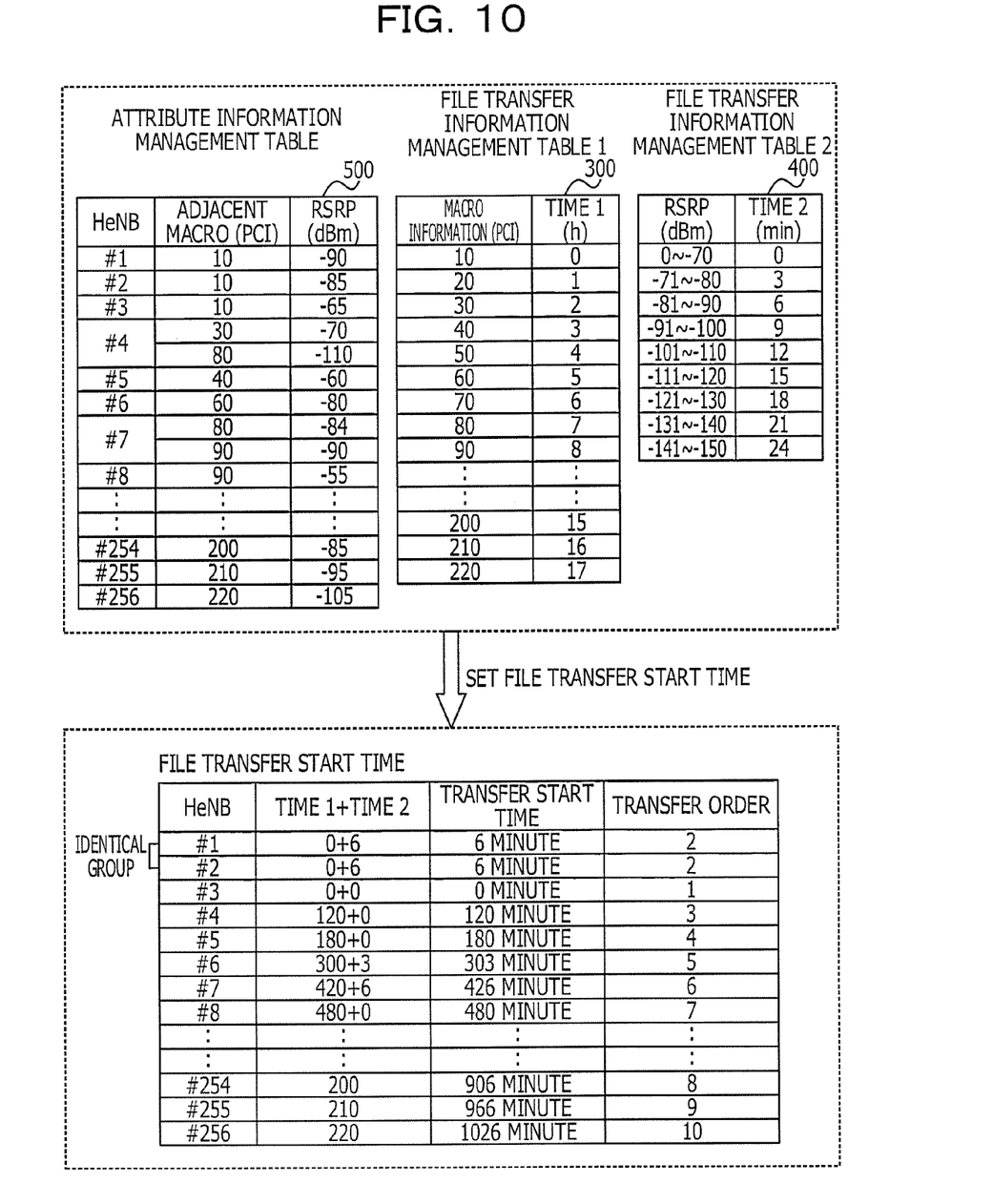
FIG. 10 illustrates an example of a setting of a file transfer start time.

FIGS. 9 and 10 illustrate an example of a setting of a file transfer start time. FIG. 9 illustrates an example of an arrangement of the HeNB. FIG. 10 illustrates an example of a setting of a file transfer start time in each of the HeNB that corresponds to FIG. 9.

As illustrated in FIG. 9, each of the plurality of base stations 100 (eNB) includes a plurality of macro cells 101 (101a to 101n), and each of the macro cells includes a unique PCI. In FIG. 9, under the control of the HeMS, 256 HeNB 110 are arranged, and the six base stations 100 (eNB) are arranged.

In each of the macro cells 101 (101a to 101n), the plurality of HeNB 110 are arranged. These HeNB are coupled to the HeMS 260 through an access network 900, and the file update is performed. An update file may be stored in the HeMS 260. The update file may be stored in a further file server, and the file update may be performed so that the HeNB 110 accesses the file server through notification from the HeMS 260.

When the plurality of HeNB 110 is arranged as illustrated in FIG. 9, a PCI and RSRP of each of the HeNB 110 are set to the attribute information management table 500 as illustrated in FIG. 10. A first delay time (Time 1) for each of the macro cells 101 (101a to 101n) is set for each of the HeNB 110 in the file transfer information management table 1 (300). A second delay time (Time 2) that corresponds to the RSRP is set in the file transfer information management table 2 (400).

In the processing of calculating a file transfer start time, the HeNB 110 calculates a file transfer start time (first delay time+second delay time) for each of the HeNB 110, based on the PCI and RSRP to which each of the HeNB 110 belongs. In FIG. 10, in the HeNB 110 (#1), the first delay time is set at 0 (h) because the PCI is 10, and the second delay time is set at 6 (m) because the RSRP is −90 (dBm), so that the file transfer start time may be six minutes. In the HeNB 110 (#2), the first delay time is set at 0 (h) because the PCI is 10, and the second delay time is set at 6 (m) because the RSRP is −85 (dBm), so that the file transfer start time may also be six minutes. These HeNB 110 (#1 and #2) may belong to an identical group.

In the HeNB 110 (#3), the first delay time is set at 0 (h) because the PCI is 10, and the second delay time is set at 0 (m) because the RSRP is −65 (dBm), so that the file transfer start time may be 0 minute.

Therefore, in transfer order of the update file, the HeNB 110 (#3) corresponds to the first order, and the HeNB 110 (#1 and #2) corresponds to the second order. In the subsequent HeNB 110 (#4 to #256), a file transfer start time is calculated by the above-described processing, and the file update is started in ascending order of the file transfer start time.

Each of the plurality of HeNB 110 that is arranged in the plurality of base stations 100 (eNB) under the control of the HeMS 260 starts file transfer with a first delay time that is different depending on each of the macro cells (PCI) in the base station 100. Therefore, the plurality of HeNB 110 in the identical base station 100 does not start the file update all at once, and performs the file update with time differences. A load in the network for the file update may be reduced.

Even each of the plurality of HeNB 110 that is arranged in the identical base station 100 (eNB) starts the file transfer with a second delay time that is different depending on each RSRP, based on the RSRP. The plurality of HeNB 110 in the identical base station 100 is grouped, and the file update is performed for each of the groups with a time difference. Therefore, the plurality of HeNB 110 in the identical base station 100 is grouped further finely for each of the RSRP, and the file update is performed for each of the groups with a time difference. The load in the network for the file update may be further reduced.

At the time of file update, the plurality of HeNB 110 does not perform the file update all at once. The plurality of HeNB 110 is grouped autonomously, and the file transfer is started so that file transfer start times are caused to different from each other for the groups. Therefore, the load in the network for the file update, for example, the load in the access network 900 illustrated in FIG. 9 may be reduced. Each of the HeNB 110 obtains a file transfer start time using a difference PCI and RSRP based on the different arrangement position of the HeNB 110, by combining a first delay time that corresponds to the PCI and a second delay time that corresponds to the RSRP. A special configuration is not desired to obtain a PCI and RSRP, and the PCI and the RSRP may be easily obtained by using an existing command between the HeNB 110 and the UE 250.

The PCI may be different depending on each of the base stations 100 (eNB), and may be different depending on each of the macro cells even in the identical base station 100. Therefore, a first delay time that corresponds to each of the PCI is different depending on the macro cell 101 that is managed by the single HeMS 260, for example, the position of the HeNB 110 in the macro cell 101. The RSRP is based on reception power from the base station 100 in the macro cell 101, so that the RSRP is different depending on the position of the HeNB 110 in the macro cell 101.

A file transfer start time is obtained by combining the first delay time based on the PCI and the second delay time based on the RSRP, so that the plurality of HeNB 110 that is arranged in the macro cell 101 is grouped appropriately, and the file update may be performed effectively in a unit of the group. As illustrated in FIG. 10, the grouping may be performed so that a single HeNB 110 may constitute a single group in addition to a plurality of HeNB 110 as long as RSRP is different depending on each of the groups. In the grouping, the plurality of HeNB 110 having an identical file transfer start time may belong to an identical group. Information on the group may or may not be transmitted and received between the plurality of HeNB 110. The HeNB 110 may or may not control the grouping.

File transfer timings of update files from the HeMS are caused to be different from each other for the plurality of HeNB, so that the network load may be reduced and a time that is taken for the file transfer may be reduced. By causing the file transfer timings of the update files to be different from each other for the plurality of HeNB in each of the plurality of macro cells that is managed by the HeMS, the processing load of the HeMS may be reduced.

The statistics processing is executed for the call connection state of the HeNB, so that the HeNB that is frequently used by the user is controlled to perform the file update. For example, a HeNB that does not receive a call frequently has a low urgency level, so that the HeNB may be controlled to perform the file transfer at the timing at which a call is received. File update may be performed depending on operation performance of the HeNB, so that the excessive network load may be reduced.

By the statistics processing of the call processing of the HeNB for each time period, for example, for a HeNB to which a call processing load is applied frequently in the daytime, setting change may be performed so that the time of the file transfer is set to the nighttime. The processing load of the HeNB may be reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A radio communication device comprising:
   a processor, provided in a cell belonging to a first base station at a position, configured to obtain, based on a program, a start time of transfer of a file from a file server based on a first delay time that is set to a physical cell identity of the cell and a second delay time that is based on reception power measured at the position of the first base station in the cell; and
   a transformer port coupled to the processor and configured to communicate with the file server, wherein the processor is configured to obtain, from equipment coupled to the cell, the physical cell identity of the cell and the reception power measured by the equipment at a timing.

2. The radio communication device according to claim 1, further comprising:
   a table including the first delay time and the second delay time, wherein the processor is configured to obtain the first delay time and the second delay time with reference to the table based on the physical cell identity of the cell and the reception power.

3. The radio communication device according to claim 2, wherein the table is configured to store a plurality of first units of a time as the first delay time and a plurality of second units of a time in a time range of the first delay time as the second delay time.

4. The radio communication device according to claim 3, wherein the first unit corresponds to a unit of an hour, and the second unit corresponds to a unit of a minute.

5. The radio communication device according to claim 1, wherein the processor is configured to start the transfer of the file after a time that is obtained by combining the first delay time and the second delay time elapses for the timing.

6. The radio communication device according to claim 1, wherein the processor is configured to change the start time of the transfer of the file based on a communication frequency with the equipment.

7. The radio communication device according to claim 1, wherein when a number of communication requests from the equipment is small, the processor is configured to start the transfer of the file based on a timing of one of the communication requests.

8. The radio communication device according to claim 1, wherein the processor is configured to perform statistics processing for a communication request from the equipment, and change the start time of the transfer of the file based on a state of a communication processing load.

9. The radio communication device according to claim 1, wherein the radio communication device corresponds to a micro base station that is configured in the cell, is coupled to another equipment to communicate with the equipment, and downloads the file from the file server through a network by the transfer.

10. A file transfer method comprising:
obtaining a start time of transfer of a file from a file server based on a first delay time that is set to a physical cell identity of a cell belonging to a first base station at a position and a second delay time that is based on reception power measured at the position in the cell;
obtaining, from equipment coupled to the cell, the physical cell identity and the reception power measured by the equipment at a timing; and
starting the transfer of the file from the file server at the start time.

11. The file transfer method according to claim 10, further comprising:
referring to a table including the first delay time and the second delay time based on the physical cell identity and reception power.

12. The file transfer method according to claim 11, wherein the table is configured to store a plurality of first units of a time as the first delay time and a plurality of second units of a time in a time range of the first delay time as the second delay time.

13. The file transfer method according to claim 10, further comprising:
starting the transfer of the file after a time that is obtained by combining the first delay time and the second delay time elapses for the timing.

14. A radio communication device comprising:
a processor, provided in a cell belonging to a first base station at a position, configured to performs, based on a program, operations to:
obtain a start time of transfer of a file from a file server based on a first delay time that is set to a physical cell identity of the cell and a second delay time that is based on reception power measured at the position in the cell; and
change the start time of the transfer of the file based on a communication frequency with equipment; and
a transformer port configured to communicate with the file server.

15. The radio communication device according to claim 14, wherein the processor is configured to obtain, from equipment coupled to the cell, the physical cell identity of the cell and the reception power measured by the equipment at the timing.

16. The radio communication device according to claim 14, wherein when a number of communication requests from the equipment is small, the processor is configured to start the transfer of the file based on a timing of one of the communication requests.

17. The radio communication device according to claim 14,
further comprising a table including the first delay time and the second delay time,
wherein the processor is configured to obtain the first delay time and the second delay time with reference to the table based on the physical cell identity of the cell and reception power.

18. The radio communication device according to claim 17, wherein the table stores a plurality of first units of a time as the first delay time and a plurality of second units of a time in a time range of the first delay time as the second delay time.

19. The radio communication device according to claim 14, wherein the processor is configured to start the transfer of the file after a time that is obtained by combining the first delay time and the second delay time elapses for the timing.

20. The radio communication device according to claim 19, wherein the first unit corresponds to a unit of an hour, and the second unit corresponds to a unit of a minute.

* * * * *